United States Patent
Tsuchitoi

(10) Patent No.: US 9,300,689 B2
(45) Date of Patent: Mar. 29, 2016

(54) APPARATUS CONNECTING TO NETWORK, CONTROL METHOD FOR APPARATUS, AND STORAGE MEDIUM

(71) Applicant: CANON KABUSHIKI KAISHA, Tokyo (JP)

(72) Inventor: Naoki Tsuchitoi, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 20 days.

(21) Appl. No.: 13/817,796

(22) PCT Filed: Jan. 21, 2013

(86) PCT No.: PCT/JP2013/000252
§ 371 (c)(1),
(2) Date: Feb. 19, 2013

(87) PCT Pub. No.: WO2013/111554
PCT Pub. Date: Aug. 1, 2013

(65) Prior Publication Data
US 2014/0123210 A1   May 1, 2014

(30) Foreign Application Priority Data
Jan. 27, 2012 (JP) ................................ 2012-015598

(51) Int. Cl.
G06F 21/57 (2013.01)
H04L 29/06 (2006.01)

(52) U.S. Cl.
CPC ............... *H04L 63/20* (2013.01); *G06F 21/57* (2013.01)

(58) Field of Classification Search
CPC ....... H04L 63/107; H04L 63/12; H04L 63/20; G06F 21/57
USPC .............. 726/14, 27, 1; 709/229, 202; 705/51
See application file for complete search history.

(56) References Cited

U.S. PATENT DOCUMENTS

| | | | |
|---|---|---|---|
| 2009/0165084 A1* | 6/2009 | Saito | 726/1 |
| 2011/0162036 A1* | 6/2011 | Heo | 726/1 |
| 2011/0173700 A1* | 7/2011 | Takahashi | 726/25 |

FOREIGN PATENT DOCUMENTS

| | | |
|---|---|---|
| JP | 2006-525562 A | 11/2006 |
| JP | 2009-230178 A | 10/2009 |
| JP | 2010-224947 A | 10/2010 |

OTHER PUBLICATIONS

JP1/Desktop Navigation Quick Reference, first edition, Hitachi Ltd., Sep. 30, 2009, pp. 61-64.

* cited by examiner

Primary Examiner — Hadi Armouche
Assistant Examiner — Angela Holmes
(74) Attorney, Agent, or Firm — Canon USA, Inc. IP Division

(57) ABSTRACT

An apparatus verifies whether a setting value is set correctly according to a security policy, and controls a screen to shift to a screen indicating a correction method if there is any incorrect setting. The apparatus includes an obtaining unit configured to obtain a security policy. Each function of the multifunction peripheral device in accordance with the security policy is verified by a verification unit. In a case where the function does not corresponding to the security policy is found as a result of verification by the verification unit, a display control unit is configured to display a security policy solution screen including a link to a change screen for changing a setting of the function.

9 Claims, 11 Drawing Sheets

Fig. 3

MANAGEMENT TABLE FOR USER MODE SETTING VALUE

| USER MODE SETTING ITEM | USER MODE SETTING VALUE | USER MODE SETTING ADDRESS |
|---|---|---|
| IPP PRINTING/USE SSL | ON | IPP_PRINT |
| SMTP/USE SSL | OFF | SMTP_SSL |
| SSL COMMUNICATION/ USE ENCRYPTION METHOD WITH HIGH ENCRYPTION INTENSITY | ON | SSL_STRONG_CIPHER |
| PDF GENERATION/ USE ENCRYPTION METHOD WITH HIGH ENCRYPTION INTENSITY | ON | PDF_STRONG_CIPHER |
| USE USER AUTHENTICATION | OFF | USER_AUTH |
| USER AUTHENTICATION/ LIMIT NUMBER OF CHARACTERS FOR PASSWORD | ON | PASSWORD_STRING |

Fig. 5

| | SECURITY POLICY | | | | |
|---|---|---|---|---|---|
| | NETWORK COMMUNICATION POLICY | | AUTHENTICATION POLICY | | |
| SETTING VALUE | ENCRYPT COMMUNICATION PATHWAY | LIMIT TO ENCRYPTION METHOD WITH HIGH ENCRYPTION INTENSITY | REQUIRE USER AUTHENTICATION | LIMIT TO PASSWORD WITH HIGH SECURITY | |
| USE IPSEC | ON/1 | — | — | — | |
| IPP PRINTING/USE SSL | ON/2 | — | — | — | |
| SMTP/USE SSL | ON/2 | — | — | — | |
| SSL COMMUNICATION/USE ENCRYPTION METHOD WITH HIGH ENCRYPTION INTENSITY | — | ON/3 | — | — | |
| PDF GENERATION/USE ENCRYPTION METHOD WITH HIGH ENCRYPTION INTENSITY | — | ON/3 | — | — | |
| USE USER AUTHENTICATION | — | — | ON/4 | — | |
| USER AUTHENTICATION/LIMIT NUMBER OF CHARACTERS FOR PASSWORD | — | — | — | ON/5 | |

| 600 POLICY FILE | CONSTRAINT CONDITION | CONSTRAINT REASON | FLAG |
|---|---|---|---|
| USE IPSEC | ON/1 | ENCRYPT COMMUNICATION PATHWAY | TRUE |
| IPP PRINTING/USE SSL | ON/2 | ENCRYPT COMMUNICATION PATHWAY | TRUE |
| SMTP/USE SSL | ON/2 | ENCRYPT COMMUNICATION PATHWAY | TRUE |
| SSL COMMUNICATION/USE ENCRYPTION METHOD WITH HIGH ENCRYPTION INTENSITY | ON/3 | LIMIT TO ENCRYPTION METHOD WITH HIGH ENCRYPTION INTENSITY | TRUE |
| PDF GENERATION/USE ENCRYPTION METHOD WITH HIGH ENCRYPTION INTENSITY | ON/3 | LIMIT TO ENCRYPTION METHOD WITH HIGH ENCRYPTION INTENSITY | TRUE |
| USE USER AUTHENTICATION | ON/4 | REQUIRE USER AUTHENTICATION | TRUE |
| USER AUTHENTICATION/LIMIT NUMBER OF CHARACTERS FOR PASSWORD | — | — | TRUE |

APPARATUS CONNECTING TO NETWORK, CONTROL METHOD FOR APPARATUS, AND STORAGE MEDIUM

TECHNICAL FIELD

The present invention relates to an apparatus connecting to a network, particularly to an apparatus in which a security policy is set thereto.

BACKGROUND ART

Recent office apparatuses such as digital multifunction peripherals needed to be operated according to an operational policy such as a security policy determined by each offices and business entities. The security policy represents a basic policy relating to information security of the business entity. For example, a policy requesting a user authentication to operate an office apparatus, or a policy requesting data encryption on a communication pathway to communicate with other apparatuses is provided as the security policy.

A recent digital multifunction peripheral can, in addition to simply printing and transmitting an image data, function as a server so that a personal computer can access to an image data stored in the digital multifunction peripheral. Therefore, as with the case of a server device, the digital multifunction peripheral is strongly requested to follow the security policy.

In a conventional digital multifunction peripheral, an administrator executes various kinds of setting (hereinafter referred to as "user mode") relating to the operation of the digital multifunction peripheral. Therefore, the digital multifunction peripheral can be operated according to the security policy at the discretion of the administrator.

However, in the conventional user mode setting, a large number of setting items have to be set in a correct manner. In a case where the user mode setting is not performed correctly, the digital multifunction peripheral is practically allowed to perform an inappropriate operation without following the security policy. As a result, there is a possibility that the security of office apparatuses will be threatened.

Therefore, Japanese Patent Application Laid-Open No. 2009-230178 discusses a system capable of externally setting a security policy as well as a user mode. In the system according to Japanese Patent Application Laid-Open No. 2009-230178, the system compares the security policy with the user mode when the apparatus is activated. Then, the apparatus is allowed to operate only when the system determines that the setting of the user mode can follow the security policy.

In the conventional system, there may be a case where the user mode setting does not follow a certain security policy when the security policy is introduced thereto. In such a case, the multifunction peripheral may be exposed to a security risk such as an information leakage or unauthorized use of information when the multifunction peripheral is activated. Therefore, in order to solve the problem, the administrator needs to make the user mode follow the security policy by changing the user mode setting.

However, a huge number of user mode setting items are provided with respect to the multifunction peripheral. Therefore, when the user mode setting does not follow the security policy, it is difficult for the administrator to find out which user mode setting item has to be changed to follow the security policy.

CITATION LIST

Patent Literature

PTL 1: Japanese Patent Application Laid-Open No. 2009-23017

SUMMARY OF INVENTION

The present invention is directed to a method capable of indicating a solution to a user in a case where an operation mode setting of an apparatus does not follow a security policy. The solution helps the user find out which setting item of the operation mode should be changed.

According to an aspect of the present invention, there is provided an apparatus including a policy setting unit configured to set a security policy of the apparatus, a mode setting unit configured to execute setting of an operation mode of the apparatus, a determination unit configured to determine whether the operation mode of the apparatus set by the mode setting unit follows the security policy set by the policy setting unit, a control unit configured to control a screen to shift to a screen for changing the setting of the operation mode which does not follow the security policy in a case where the determination unit determines that the operation mode of the apparatus does not follow the security policy.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

FIG. 3 is a chart illustrating user mode setting values stored in a storage device of the multifunction peripheral.

FIG. 5 is a chart illustrating a policy table stored in the storage device of the multifunction peripheral.

FIG. 6 is a policy file generated by the multifunction peripheral.

DESCRIPTION OF EMBODIMENTS

Various exemplary embodiments, features, and aspects of the invention will be described in detail below with reference to the drawings.

Hereinafter, a first exemplary embodiment according to the present invention will be described with reference to FIGS. 1 through 11.

Figure 1:
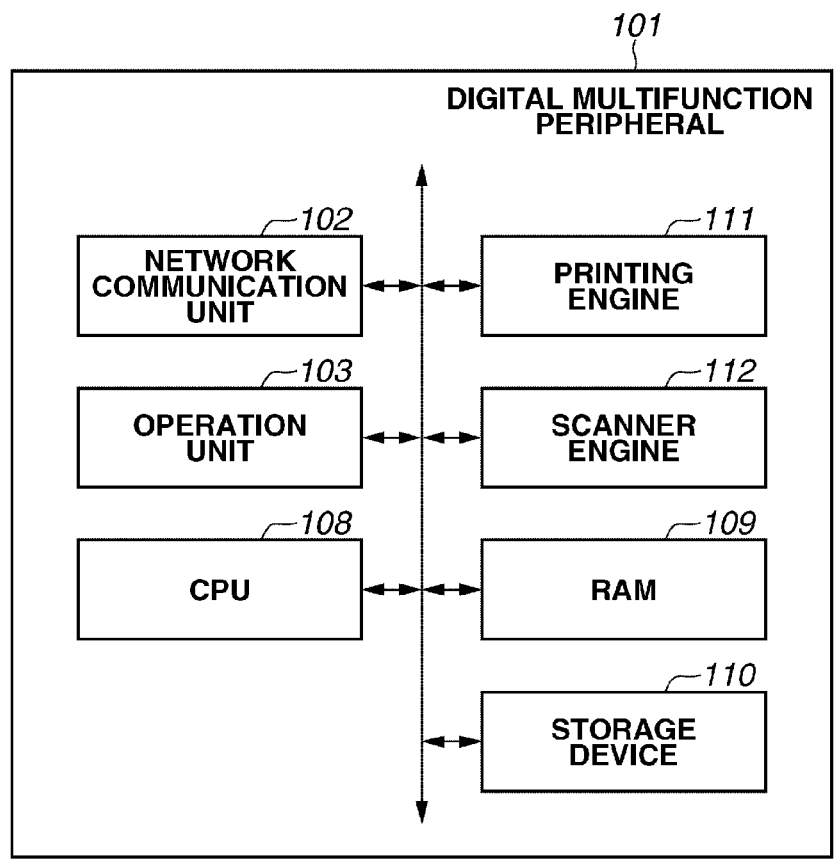
FIG. 1 is a block diagram illustrating a hardware configuration of a multifunction peripheral according to a present exemplary embodiment.

FIG. 1 is a block diagram illustrating a hardware configuration of a digital multifunction peripheral (hereinafter simply referred to as "multifunction peripheral") 101 serving as an example of an office apparatus. In FIG. 1, a network communication unit 102 connects the multifunction peripheral 101 with a personal computer (PC) and other digital multifunction peripheral.

An operation unit 103 is configured of a display portion (display unit) and an input portion (input unit), and connected to the multifunction peripheral 101. The display unit displays various setting statues and an operational status of the multifunction peripheral 101, whereas the input unit accepts a user operation of the multifunction peripheral 101. As constituent elements for the operation unit 103, there are provided a liquid crystal panel, a touch panel which is integrated with the liquid crystal panel, and a hard key which mechanically and physically realizes a contact point of the input unit. The liquid crystal panel corresponds to the display unit whereas the touch panel and the hard key correspond to the input units.

A central processing unit (CPU) 108 performs image processing of print data as well as various kinds of control processing. Information such as a program code and image data for the CPU 108 to operate is temporarily stored in a random access memory (RAM) 109.

A storage device 110 is a non-volatile memory where a program code for the CPU 108 to execute and image data for printing, editing, and transmitting are stored. In addition to the program code and the image data, a setting value (hereinafter referred to as "user mode setting value") relating to an operation of the multifunction peripheral 101 is stored in the storage device 110. As described below, the user mode setting value can be changed by pressing a user mode setting icon displayed on the operation unit 103. Further, the data for a security policy determined by an office or a business entity is stored in the storage device 110.

A printing engine 111 prints an image on a paper medium by employing known techniques such as an electro-photographic technique and an ink jet technique. A scanner engine 112 optically reads an image printed on a paper medium.

When the multifunction peripheral 101 functions as a copy machine by employing hardware resources such as the scanner engine 112 and the printing engine 111, the multifunction peripheral 101 performs the following processing. Upon receiving a user operation performed through the operation unit 103 as a starting point, the CPU 108 reads image data from the scanner engine 112 according to a program code extracted to the RAM 109 from the storage device 110. Then, the CPU 108 imports the read image data to the RAM 109, and performs predetermined image processing. Thereafter, the CPU 108 outputs the image data to the printing engine 111.

Further, when the multifunction peripheral 101 performs transmission processing by employing hardware resources such as the scanner engine 112 and a network communication unit 102, the multifunction peripheral 101 performs the following processing. Upon receiving a user operation performed through the operation unit 103 as a starting point, the CPU 108 reads image data from the scanner engine 112 according to a program code extracted to the RAM 109. Then, the CPU 108 imports the read image data to the RAM 109, and performs a predetermined format conversion. Thereafter, the CPU 108 outputs the image data to the network communication unit 102 so that the image data is transmitted to an apparatus of a specified address.

Figure 2:
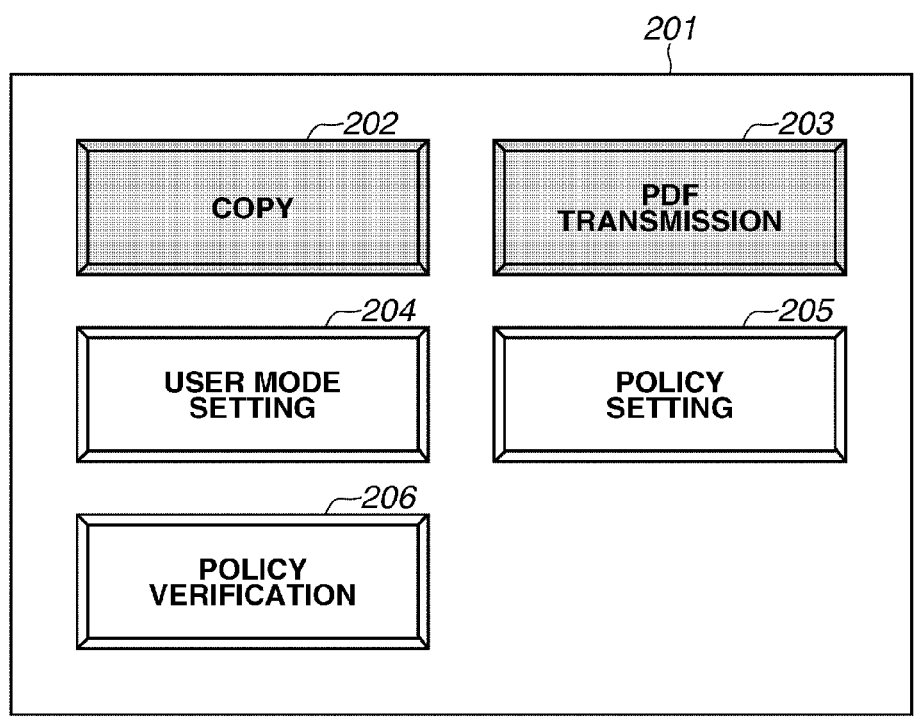
FIG. 2 is a diagram illustrating an example of a screen displayed on an operation unit of the multifunction peripheral.

FIG. 2 is a diagram illustrating an example of a first operation screen displayed on the operation unit 103 when the multifunction peripheral 101 is activated. An entire operation screen 201 includes a copy icon 202, a PDF transmission icon 203, a user mode setting icon 204, a policy setting icon 205, and a policy verification icon 206. A copy function is selected by the copy icon 202. A transmission function is selected by the PDF transmission icon 203. A user mode setting value is set by the user mode setting icon 204. A security policy is set by the policy setting icon 205. Verification of the security policy is executed by the policy verification icon 206.

In the example of the operation screen illustrated in FIG. 2, functions of the multifunction peripheral 101 are restricted because the verification of the security policy has not been performed. Therefore, in the operation screen, the copy icon 202 and the PDF transmission icon 203 cannot be pressed.

FIG. 3 is a chart illustrating a management table for managing a user mode setting value stored in the storage device 110. The user mode setting value 301 illustrated in FIG. 3 can be input and changed through an operation screen (not illustrated). The operation screen is displayed when a user presses the user mode setting icon 204 in FIG. 2.

The left column of the management table in FIG. 3 indicates a user mode setting item 300 of the user mode setting value 301. In the present exemplary embodiment, the user mode setting item 300 includes "IPP Printing/Use SSL" and "SMTP/Use SSL" as setting items. The user mode setting item 300 further includes "SSL Communication/Use Encryption Method with High Encryption Intensity", "PDF Generation/Use Encryption Method with High Encryption Intensity", "Use User Authentication", and "User Authentication/Limit Number of Characters for Password" as setting items.

The Internet Printing Protocol (IPP) indicated in FIG. 3 is a protocol for transmitting printing data to a printer or the multifunction peripheral 101 via the internet. The IPP is defined in the RFC (Request for Comments) 2565.

Further, the Simple Mail Transfer Protocol (SMTP) is a protocol for an e-mail transmission defined in the RFC 821. The SMTP is employed when an image scanned by the multifunction peripheral 101 is transmitted as an attached file of an e-mail.

Both the IPP and the SMTP are employed to transmit and receive image data via a network (in particular, the internet). Therefore, there is a possibility that confidential data is included in the IPP and the SMTP. Therefore, the Secure Socket Layer (SSL) is used to encrypt a communication pathway. The SSL is a protocol which performs encryption and provides completeness with respect to a transmission control protocol (TCP) session. The SSL is defined in the RFC 2246.

In addition, the Portable Document Format (PDF) is a format of an electronic document defined in the ISO-32000. The PDF can be encrypted in order to protect the confidentiality thereof. A plurality of encryption methods is provided as an encryption method of the PDF. In the security policy, the encryption method for the PDF is limited to an encryption method with high encryption intensity.

The user mode setting value 301 is set by an operation performed in step S705 of FIG. 7 described below. In the present exemplary embodiment, the user mode setting value 301 is represented by a binary notation "ON" or "OFF". However, the user mode setting value 301 may be a numerical value, or may be configured of a plurality of structured portions. Further, a list of user mode setting value 301 is stored in the storage device 110. For example, the list of user mode setting value 301 is stored in an extensible markup language (XML) format or a comma separated values (CSV) format.

A user mode setting address 311 represents information indicating a setting address of each user mode setting value 301. The user mode setting address 311 is the information which uniquely identifies an operation screen for setting the user mode setting item 300 corresponding to the user mode setting address 311. In other words, in a case where a result of security policy verification is unsuccessful, the user mode setting address 311 is provided, with which a screen can be easily shifted to a screen for changing the corresponding user mode setting value 301. The user mode setting address 311 will be described when the operation performed in step S1010 is described.

The user mode setting value 301 of FIG. 3 only illustrates setting values of the user mode setting items relating to the application of the security policy according to the present exemplary embodiment. Therefore, various kinds of user mode setting values other than the user mode setting values relating to the security policy exist.

Figure 4:
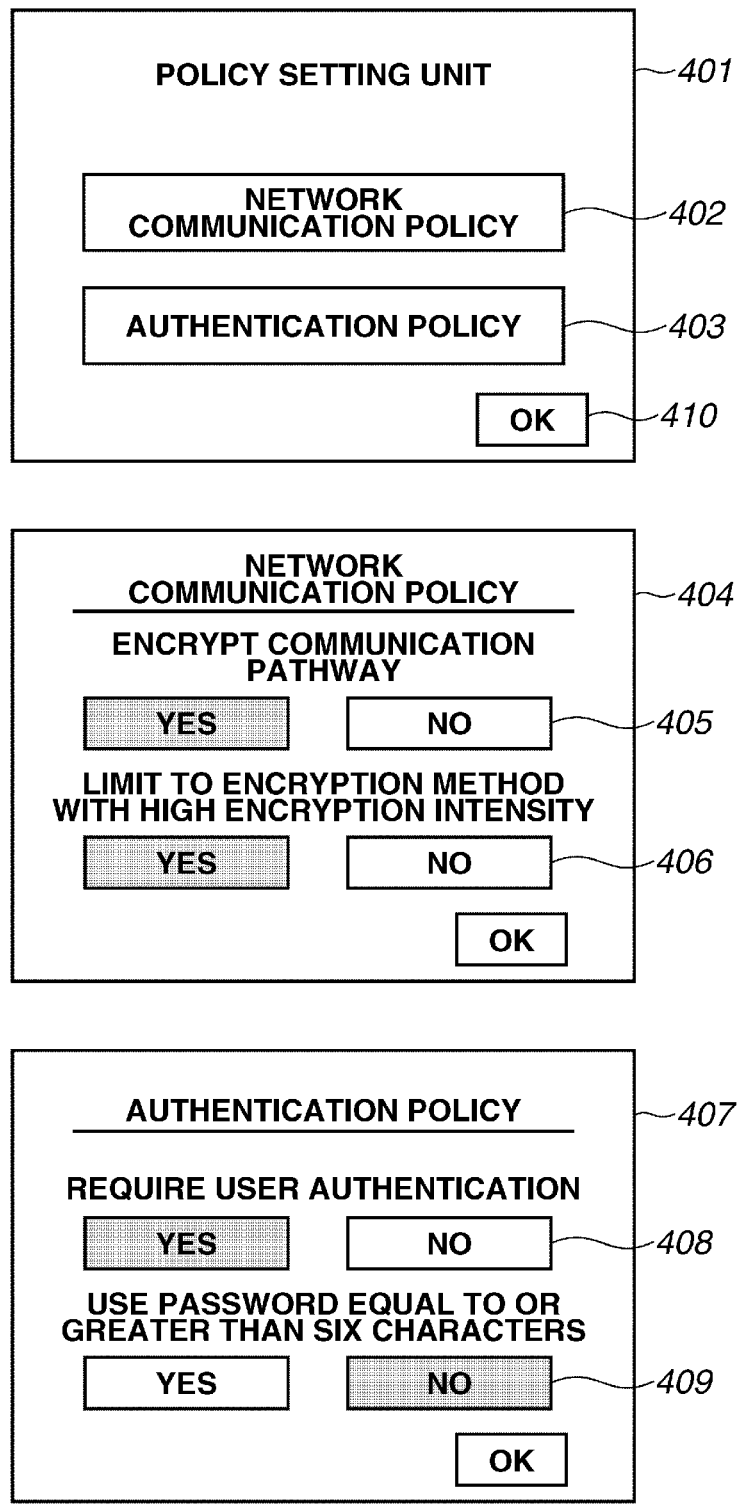
FIG. 4 is a diagram illustrating examples of screens for setting a security policy when a policy setting icon is pressed in the screen illustrated in FIG. 2.

FIG. 4 is a diagram illustrating screens for setting the security policy displayed on the operation unit 103. A policy setting screen 401 is displayed when the policy setting icon 205 in FIG. 2 is pressed. In addition, only an administrator with a particular authority can set the security policy through the above-described screens.

The policy setting screen 401 is a screen for setting the security policy. In the present exemplary embodiment, in order to make the description simple, only two security policies, i.e., a network communication policy 402 and an authentication policy 403 will be described. However, various kinds of security policies other than the above mentioned policies may actually be provided.

A network communication policy icon 402 is an icon that is selected to set a communication policy. The communication policy is a security policy for the multifunction peripheral 101 to communicate with a terminal on the network. An authentication policy icon 403 is an icon that is selected to set an authentication policy. The authentication policy is a security policy for the multifunction peripheral 101 to authenticate a user who logs onto the multifunction peripheral 101.

A network communication policy screen 404 is displayed when the network communication policy icon 402 is pressed. On the network communication policy screen 404, two security policies "Encrypt Communication Pathway" and "Limit to Encryption Method with High Encryption Intensity" are displayed. Further, YES/NO icons 405, 406 are provided with respect to the two security policies. Each of the YES/NO icons 405, 406 is used to set whether to apply the security policy. In FIG. 4, the icons in white letters with black background are selected. Therefore, in the network communication policy screen 404 of FIG. 4, both of the security policies, "Encrypt Communication Pathway" and "Limit to Encryption Method with High Encryption Intensity", are selected as the security policies.

An authentication policy screen 407 is displayed when the authentication policy icon 403 is pressed. On the authentication policy screen 407, two security policies, "Require User Authentication" and "Use Password Equal To Or Greater Than Six Characters" are displayed. Likewise, YES/NO icons 408, 409 are provided with respect to the two security policies. Each of the YES/NO icons 408, 409 is used to set whether to apply the security policy. In the authentication policy screen 407 of FIG. 4, the security policy "Require User Authentication" is selected as the security policy. An OK icon 410 is pressed to complete the setting of the security policy. When the setting thereof is completed, the CPU 108 generates a policy file described below.

FIG. 5 is a chart illustrating a policy table stored in the storage device 110. The policy table associates the security policy with the user mode setting item 300. The policy table is stored in the storage device 110 as digital information. A format of the policy table may be the XML format or the CSV format.

Each column in the policy table in FIG. 5 represents a security policy, whereas each row represents a user mode setting item. Further, "ON/(numerical value)" in each cell indicates that a user mode setting item of the corresponding row is a prerequisite for a security policy of the corresponding column. On the other hand a symbol "-" indicates that a user mode setting item of the corresponding row is not a prerequisite for a security policy of the corresponding column.

For example, the security policy "Encrypt Communication Pathway" of the network communication policy is set through the network communication policy screen 404 of FIG. 4. In this case, in order to follow the security policy thereof, either the user mode setting value of the user mode setting item "Use IPSec", the user mode setting values of the user mode setting items "IPP Printing/Use SSL", or "SMTP/Use SSL" needs to be set as ON. The Security Architecture for Internet Protocol (IPSec) defined in the RFC 1825 is a protocol which provides functions for preventing data from being falsified and keeping confidentiality of the data in an IP packet unit.

The numerical value after "ON/" represents a policy group. In a case where a security policy has policy groups specified by numerical values, a user mode setting value which belongs to any of the policy groups of the security policy has to be ON. For example, the security policy "Encrypt Communication Pathway" has two policy groups, a policy group 1 and a policy group 2. Therefore, in order to follow the security policy "Encrypt Communication Pathway", it is necessary to either set the user mode setting value of "Use IPSec" in the group 1 to ON, or set both of the user mode setting values of "IPP printing/Use SSL" and "SMTP/Use SSL" in the group 2 to ON.

Accordingly, in order to fulfill the security policy for the network communication policy, the administrator is provided with a plurality of solutions. For example, the administrator selects the policy group "ON/1" for the network communication policy. In this case, the encryption is performed on the IP layer through the IPSec. Therefore, the encryption will not be necessary for the IPP and the SMTP which operate on the higher layers thereof. Accordingly, it is not necessary to set the user mode setting values of the group 2 to ON.

On the other hand, in a case where the administrator selects the policy group "ON/2" for the network communication policy, the encryption through the IPSec is not selected as a prerequisite. Therefore, the IPP and the SMTP have to be encrypted by using the SSL. As described above, in order to achieve one security policy, the administrator is capable of selecting a solution from a plurality of solutions.

In a case where the setting value of the user mode setting item which is a prerequisite for the applied security policy is OFF, the copy icon 202 and the PDF transmission icon 203 of the operation screen 201 in FIG. 2 are displayed in a shaded state, and thus predetermined functions of the multifunction peripheral 101 are restricted.

On the other hand, for example, the administrator sets the security policy "Use Encryption Method with High Encryption Intensity" to "YES". In this case, two user mode setting items, "SSL Communication/Use Encryption Method with High Encryption Intensity" and "PDF Generation/Use Encryption Method with High Encryption Intensity", indicated as "ON/3" are the prerequisites. Therefore, two user mode setting values thereof need to be ON.

Similarly, when the security policy "Require User Authentication" is applied, the user mode setting item "Use User Authentication" is a prerequisite. In a same manner, when the security policy "Limit to Password with High Security" is applied, the user mode setting item "User Authentication/Limit Number of Characters for Password" is a prerequisite therefor. In the example of the authentication policy screen 407 of FIG. 4, "NO" is set for the security policy "Limit to Password with High Security". Therefore, no user mode setting item will be set as a prerequisite for the security policy thereof.

Based on the policy table in FIG. 5 and a security policy that is input to the policy setting screen 401 of FIG. 4 through the operation unit 103, the CPU 108 extracts a user mode setting item that is a prerequisite for the security policy. Then, the CPU 108 generates a policy file (policy file 600 in FIG. 6 described below) indicating the prerequisite user mode setting item, and stores the policy file 600 in the storage device 110.

FIG. 6 is a chart illustrating an example of the policy file 600 generated by the CPU 108. The CPU 108 generates the policy file 600 when the security policy is set by the policy setting icon 205. The policy file 600 in FIG. 6 is dynamically generated by the combination of the above-described policy table in FIG. 5 and the setting of the security policy input to the policy setting screen 401 of FIG. 4. Specifically, "ON/numerical value (policy group number)" is indicated in a column of "constraint condition" of the extracted user mode setting item that is set to be a prerequisite for the security policy. Then, the security policy corresponding to that prerequisite user mode setting item is indicated in a column of "constraint reason".

On the other hand, a column of the constraint condition or the constraint reason with a symbol "-" indicates that the constraint condition or the constraint reason is not applied. In addition, a "flag" column is a region that is used when verification of the security policy (described below) is executed.

A file format of the policy file 600 may be the XML format or the CSV format. However, the file format can be any file format as long as the data structure thereof can express a chart. The policy file 600 in FIG. 6 is used to determine whether the user mode setting value of the multifunction peripheral 101 follows the security policy.

A general system configuration in which the present exemplary embodiment is embodied, and a data structure which is required for a proper operation of the multifunction peripheral 101 according to the security policy have been described as the above. Hereinafter, the operation of the multifunction peripheral 101 according to the present exemplary embodiment will be described.

Figure 7:
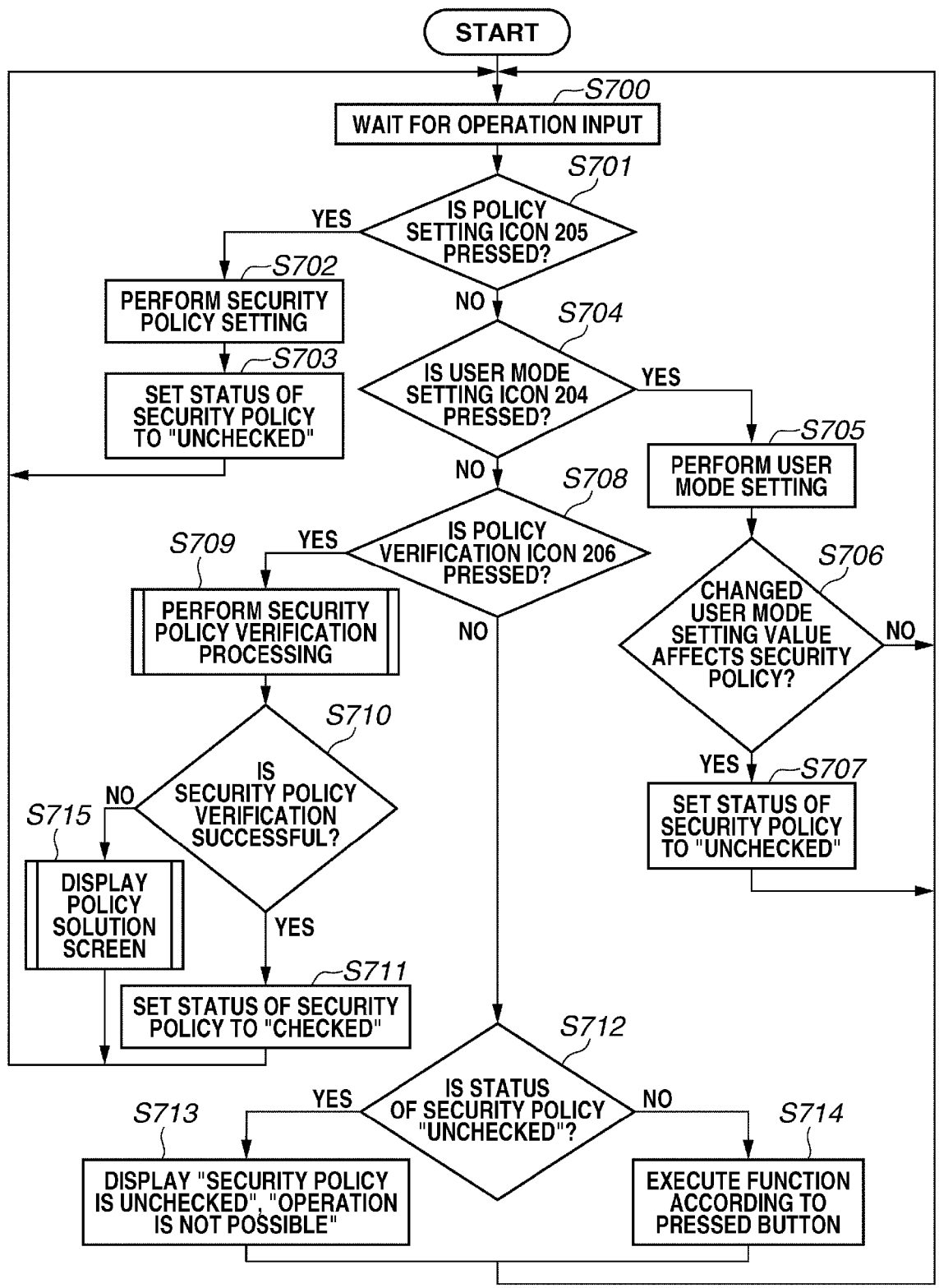
FIG. 7 is a flowchart illustrating processing executed by the multifunction peripheral according to an operation performed by an operation unit.

FIG. 7 is a flowchart illustrating the operation executed by the multifunction peripheral 101. The operation unit 103 of the multifunction peripheral 101 starts operating when the multifunction peripheral 101 is activated. Then, the operation unit 103 continuously operates until the multifunction peripheral 101 stops the operation.

First, in step S700 of FIG. 7, the CPU 108 waits for a user input from the input unit of the operation unit 103. In a case where the input unit is a touch panel, the user input is accepted when a user presses an icon displayed on a liquid crystal panel.

In step S701, the CPU 108 determines whether the user input is caused by pressing the security policy setting icon 205. When the CPU 108 determines that the user input is an input from the security policy setting icon 205 (YES in step S701), the processing proceeds to step S702. In step S702, the CPU 108 displays the policy setting screen 401 illustrated in FIG. 4 on the operation unit 103, and accepts setting of the security policy made by the user (practically, a user who has a particular administrative right). Pieces of the information for the security policies set on the policy setting screen 401, the network communication policy screen 404, and the authentication policy screen 407 respectively are stored in the storage device 110 when the OK icon 410 is pressed.

In a case where the multifunction peripheral 101 operates in an existing state where the security policy has just been set, there is a possibility that the multifunction peripheral 101 operates in an unauthorized state. Therefore, in step S703, the CPU 108 sets a flag for the security policy to "UNCHECKED". Thereafter, the processing returns to step S700. In the present exemplary embodiment, when the status of the security policy is unchecked, the copy icon 202 and the PDF transmission icon 203 in FIG. 2 are displayed in a shaded state, and the corresponding functions thereof are prohibited from being used.

The above-described processing is performed along with change in the security policy setting. This prevents the multifunction peripheral 101 from being used when the setting of the multifunction peripheral 101 does not follow the security policy.

When the CPU 108 determines that the user input is not an input from the security policy setting icon 205 (NO in step S701), the processing proceeds to step S704. In step S704, the CPU 108 determines whether the user input is an input from the user mode setting icon 204. When the CPU 108 determines that the user input is an input from the user mode setting icon 204 (YES in step S704), the processing proceeds to step S705. When the CPU 108 determines that the user input is not an input from the user mode setting icon 204 (NO in step S704), the processing proceeds to step S708.

In step S705, the CPU 108 sets a user mode setting value according to the user input from the operation unit 103. When the CPU 108 completes setting of the user mode setting value, the processing proceeds to step S706. In step S706, the CPU 108 determines whether the user mode setting value set in step S705 affects (relates to) the security policy. In other words, the CPU 108 determines whether any of the user mode setting values of the user mode setting items illustrated in FIG. 3, "IPP Printing Processing/Use SSL", "SMTP/Use SSL", "SSL Communication/Use Encryption Method with High Encryption Intensity", "PDF Generation/Use Encryption Method with High Encryption Intensity", "Use User Authentication", and "User Authentication/Limit Number of Characters for Password", is changed.

When the CPU 108 determines that the user mode setting value which affects the security policy is changed (YES in step S706), the processing proceeds to step S707. In step S707, the CPU 108 sets the status of the security policy to "UNCHECKED". Thereafter, the processing returns to step S700. When the CPU 108 determines that the user mode setting value which affects the security policy is not changed (NO in step S706), the processing returns to step S700.

In step S708, the CPU 108 determines whether the operation performed by the operation unit 103 is an operation performed through the policy verification icon 206. When the CPU 108 determines that the operation performed on the operation unit 103 is an operation performed through the policy verification icon 206 (YES in step S708), the processing proceeds to step S709. In step S709, the CPU 108 executes verification of the security policy. The details of the processing performed in step S709 will be described below with reference to FIG. 8.

In step S710, the CPU 108 determines whether the verification of the security policy is successful. If the CPU 108 determines that the verification of the security policy is successful (YES in step S710), the processing proceeds to step S711. In step S711, the CPU 108 sets a status of the security policy to "CHECKED" (i.e., the CPU 108 cancels the unchecked flag for the security policy). Then, the processing returns to step S700. In the present exemplary embodiment, when the CPU 108 sets the status of the security policy to "CHECKED", the CPU 108 causes the copy icon 202 and the PDF transmission icon 203 in FIG. 2 to return to the original state from the shaded state.

If the CPU 108 determines that the verification of the security policy is not successful (NO in step S710), the processing proceeds to step S715. In step S715, the CPU 108 identifies a reason why the security policy is not fulfilled, and displays a security policy solution screen 901 (see FIG. 9). A method for generating and displaying the security policy solution screen 901 will be described below with reference to FIG. 10.

In step S708, when the CPU 108 determines that the operation performed by the operation unit 103 is not the operation performed through the policy verification icon 206 (NO in step S708), the CPU 108 determines that either the copy icon 202 or the PDF transmission icon 203 is pressed. Then, the processing proceeds to step S712. In step S712, the CPU 108 determines whether the status of the security policy is unchecked.

When the CPU 108 determines that the status of the security policy is unchecked (YES in step S712), the processing proceeds to step S713. In step S713, the CPU 108 causes the operation unit 103 to display "SECURITY POLICY IS UNCHECKED", "OPERATION IS NOT POSSIBLE". Then, the CPU 108 restricts the operation thereof from being performed. On the other hand, when the CPU 108 determines that the status of the security policy is checked (NO in step S712), the processing proceeds to step S714. In step S714, the CPU 108 executes a selected function. "The selected function" represents a function unique to the multifunction peripheral 101 such as a copy function or a transmission function.

As described above, the checking status of the security policy is set to "UNCHECKED" in step S707 and step S703 according to the change in the user mode setting value or the change in the security policy. Then, the copy function or the transmission function of the multiple peripheral 101 will be prohibited as long as the status of the security policy is unchecked. The status of the security policy will be changed to "CHECKED" from "UNCHECKED" when the verification of the security policy is performed and succeeds. Through this process, an operation unique to the multifunction peripheral 101 is allowed to be performed only when the CPU 108 confirms that the security policy thereof is maintained.

Figure 8:
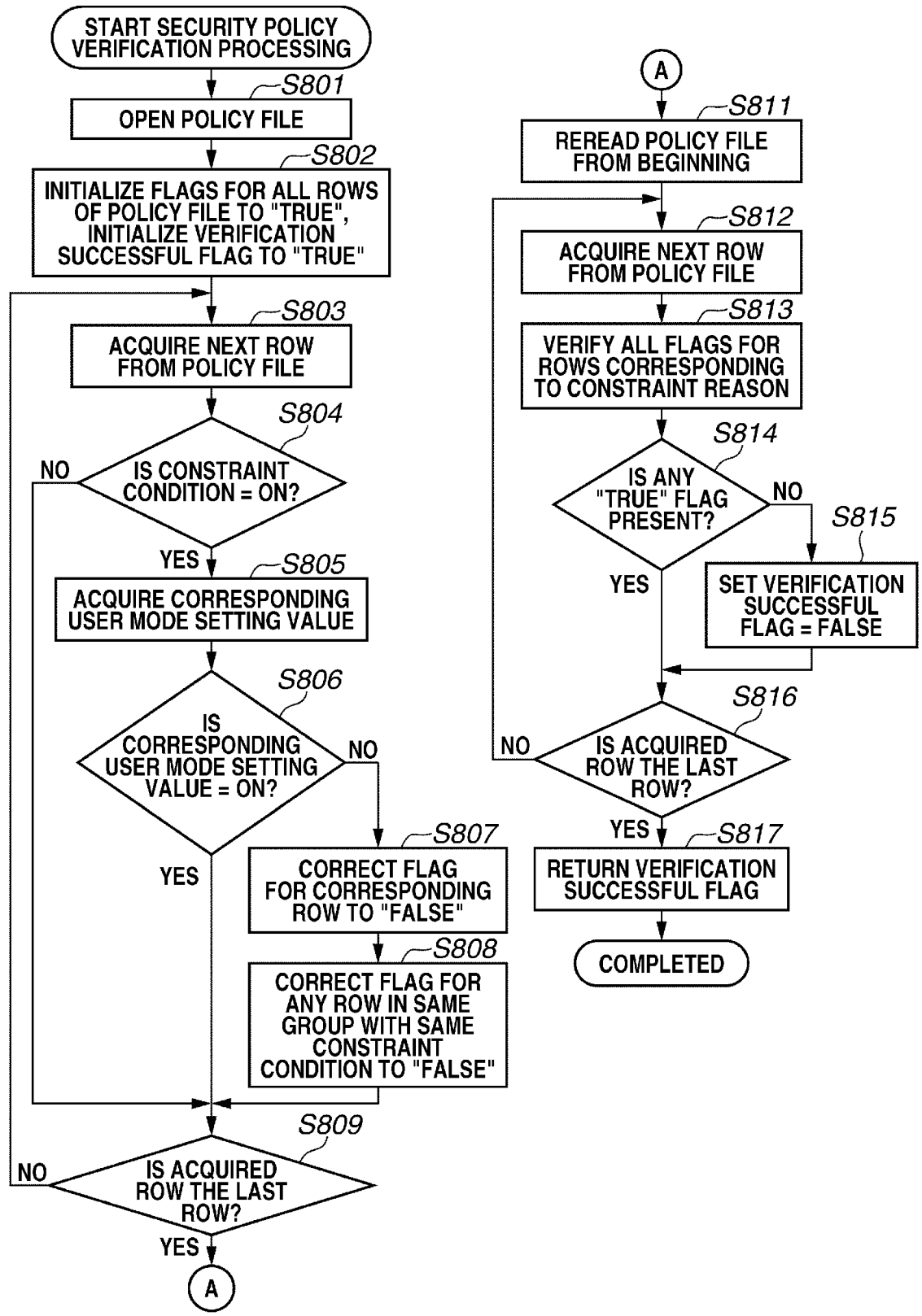
FIG. 8 is a flowchart illustrating processing executed by the multifunction peripheral when a policy verification icon of the operation unit is pressed.

FIG. 8 is a flowchart illustrating the operation of the multifunction peripheral 101. The processing of the flowchart in FIG. 8 corresponds to the processing in step S709 of the flowchart in FIG. 7.

In step S801, the CPU 108 acquires a policy file 600 from the storage device 110 according to an input from the operation unit 103 via the policy verification icon 206. Next, in step S802, the CPU 108 once initializes all of the flags in the right side row of the policy file 600 acquired in step S801 to "TRUE". "TRUE" indicates that the constraint condition is fulfilled.

In step S803, the CPU 108 acquires one row from the policy file 600 at a time. From step S803 onward, the processing is performed in a loop manner. The acquired row corresponds to each row of the policy file 600 illustrated in FIG. 6. In step S804, the CPU 108 checks a constraint condition of the acquired row. This constraint condition corresponds to a value indicated in a cell of the column "constraint condition" in FIG. 6. For example, the constraint condition of the user mode setting item "IPP Printing/Use SSL" is "ON/2".

In step S804, the CPU 108 checks a value of the constraint condition, and determines whether the constraint condition is present. In the example in FIG. 6, the CPU 108 determines that the constraint condition is present when the constraint condition is indicated as "ON", whereas the CPU 108 determines that the constraint condition is not present when the constraint condition is indicated as "-".

In a case where the CPU 108 determines that the constraint condition is not present (NO in step S804), the processing proceeds to step S809. In step S809, the CPU 108 determines whether all of the rows in the policy file 600 have been checked. If the CPU 108 determines that the unchecked row is still present (NO in step S809), the processing returns to step S803. On the other hand, in a case where the CPU 108 determines that the constraint condition is present (YES in step S804), the processing proceeds to step S805. In step S805, the CPU 108 acquires a corresponding user mode setting value from the storage device 110.

In step S806, the CPU 108 determines whether the constraint condition and the user mode setting value match with each other. In the above-described example, the constraint condition is indicated as "ON/2", whereas the user mode setting value is set to "ON". Therefore, the CPU 108 determines that the user mode setting value with respect to the corresponding row fulfills the security policy, and determines that the constraint condition and the user mode setting value match with each other (YES in step S806). In this case, the processing simply proceeds to step S809.

On the other hand, in a case where the CPU 108 determines that the constraint condition does not match with the user mode setting value (NO in step S806), the processing proceeds to step S807. In step S807, the CPU 108 changes a flag of the corresponding row to "FALSE" from "TRUE". Based on the flag set in step S807, the CPU 108 can determine whether the setting of the multifunction peripheral 101 follows the security policy in the processing described below.

Next, in step S808, of the unchecked rows having the same constraint reason as that of the row acquired in step S803, the CPU 108 verifies whether any row in the same policy group as that of the row acquired in step S803 is included. After performing the above verification, if the CPU 108 finds out that the row in the same policy group as that of the row acquired in step S803 is included in the unchecked rows having the same constraint reason thereof, the CPU 108 also changes a flag of that row to "FALSE" from "TRUE". The CPU 108 also changes the flag of the row in the same policy group having the same constraint reason to "FALSE" due to the following reason. The CPU 108 changes the flag to "FALSE" because if any one of the user mode setting values in a same policy group with a same constraint reason does not match with the constraint condition, the security policy cannot be fulfilled based on the user mode setting value in that policy group.

For example, in FIG. 6, with respect to the constraint reason "Encrypt Communication Pathway", two user mode setting items "IPP Printing/Use SSL" and "SMTP/Use SSL" are provided as a policy group 2. If a user mode setting value of any one of the user mode setting items is set to "OFF", the security policy cannot be fulfilled in the policy group 2. Therefore, the CPU 108 changes both of the flags in the group 2 to "FALSE" from "TRUE".

In step S809, the CPU 108 determines whether all of the rows in the policy file 600 are checked. In a case where the CPU 108 determines that an unchecked row is still present (NO in step S809), the processing returns to step S803. In a case where the CPU 108 determines that all of the rows are checked (YES in step S809), the processing proceeds to step S810. In step S810, the CPU 108 once initializes a verification successful flag in variable number to "TRUE". "TRUE" indicates that the verification of the security policy is successful. In step S811, the CPU 108 rereads the policy file 600 from the beginning. In step S812, the CPU 108 acquires a next row from the policy file 600. From step S812 onward, the processing is performed in a loop manner.

In step S813, the CPU 108 verifies flags of all the rows having the same constraint reason as that of the row acquired in step 812. Then, in step S814, the CPU 108 determines whether any "TRUE" flag is left in any one of the rows. Through this, the CPU 108 determines whether there is any policy group which fulfills the constraint reason.

When the CPU 108 determines that the "TRUE" flag is not left (NO in step S814), the processing proceeds to step S815. In step S815, the CPU 108 sets the verification successful flag to "FALSE". When the CPU 108 determines that the "TRUE" flag is left (YES in step S814), the processing proceeds to step S816.

In step S816, the CPU 108 determines whether all of the rows in the policy file 600 have been checked. If the CPU 108 determines that the row is still left (NO in step S816), the processing returns to step S812. If the CPU 108 determines that the checked row is the last row (YES in step S816), the processing proceeds to step S817. In step S817, the CPU 108 returns the verification successful flag. The verification successful flag is set to "TRUE" only when the policy group capable of fulfilling the security policy is present for every constraint reason. Therefore, the verification successful flag is set to "FALSE" when the policy group capable of fulfilling the security policy is not present for any constraint reason. As described above, based on the plurality of constraint reasons and the plurality of security policy groups, the CPU 108 can determine whether the multifunction peripheral 101 is set in accordance with the policy file 600.

Figure 9:
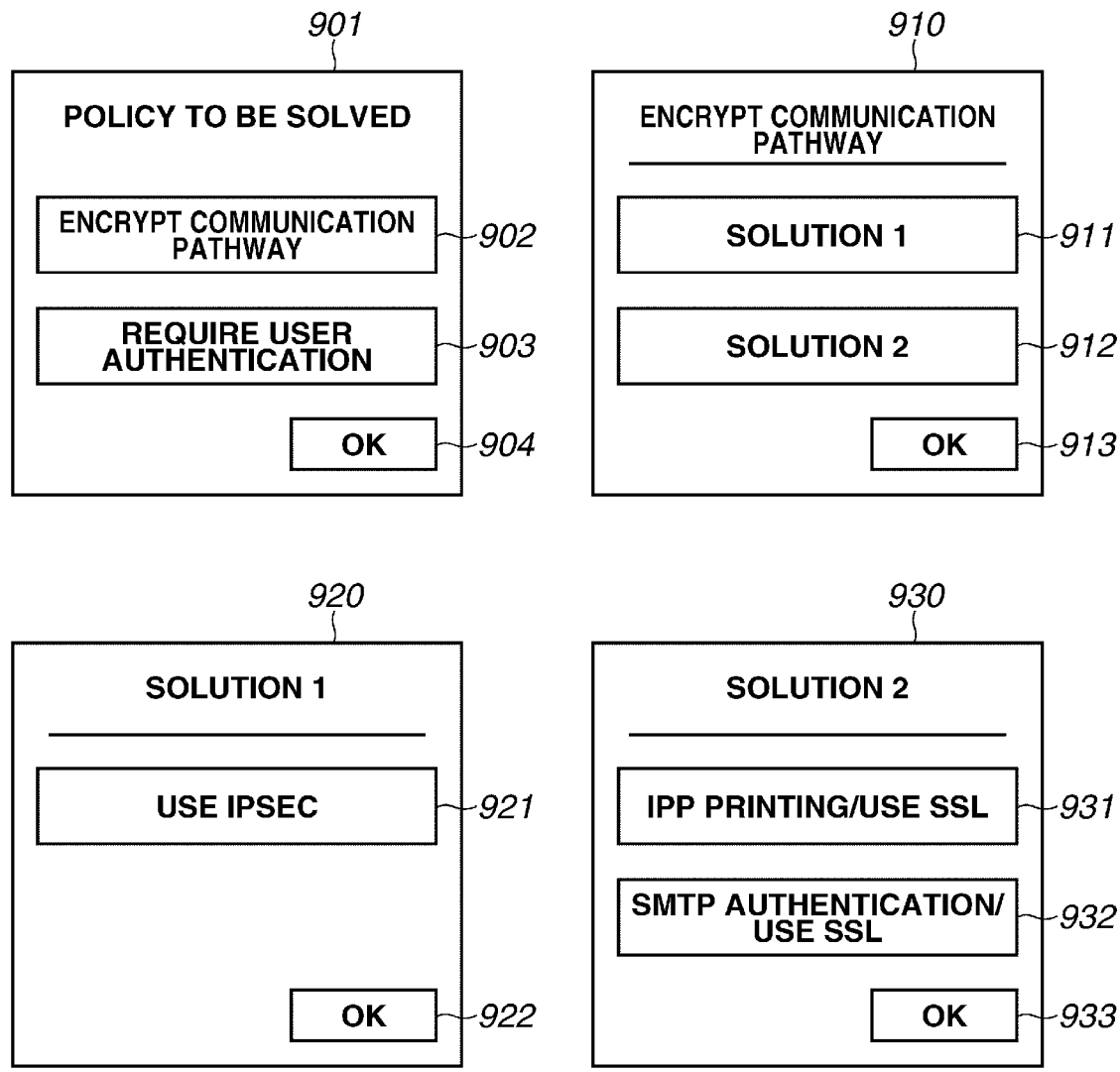
FIG. 9 is a diagram illustrating examples of screens to be displayed when the multifunction peripheral does not follow the security policy.

FIG. 9 is a diagram illustrating examples of screens for indicating solutions. These screens are displayed when the multifunction peripheral 101 does not follow the security policy. Each screen in FIG. 9 is displayed on the operation unit 103 according to an instruction from the CPU 108.

A security policy solution screen 901 is a first screen displayed if the CPU 108 determines that the multifunction peripheral 101 does not follow the security policy. In the security policy solution screen 901, one icon is displayed for each constraint reason that has to be solved in order to follow the security policy. The constraint reason which follows the security policy is not displayed on the security policy solution screen 901.

The security policy solution screen 901 illustrated as an example in FIG. 9 is displayed when the security policies "Encrypt Communication Pathway" and "Require User Authentication" are not fulfilled. In other words, the security policy solution screen 901 is displayed if there is a user mode setting value which does not follow the security policy. In a case where a single screen cannot display all of the icons, a scroll bar may be displayed to scroll the security policy solution screen 901.

When all of the user mode settings are completed, an OK icon 904 is pressed to end the security policy solution screen 901. A screen 910 is displayed when an icon "Encrypt Communication Pathway" 902 is pressed. In the screen 910, with respect to the constraint reason "Encrypt Communication Pathway", either an icon 911 for a solution 1 or an icon 912 for a solution 2 can be selected. In other words, the screen 910 indicates that two solutions are available with respect to the constraint reason.

When all of the user mode settings are completed, an OK icon 913 is pressed to end the screen 910.

When the icon 911 for the solution 1 is pressed, the screen 910 is shifted to a screen 920. In the screen 920, an icon 921 indicating the user mode setting item "Use IPSec" is displayed as a solution. In a case where the icon 912 for the solution 2 is pressed, the screen 910 is shifted to a screen 930. In the screen 930, an icon 931 and an icon 932 which respectively indicate the user mode setting items "IPP Printing/Use SSL" and "SMTP Authentication/Use SSL" are displayed as solutions while both of the icons 931 and 932 are displayed in a selectable manner. When all of the user mode settings are completed, an OK icon 933 is pressed to end the screen 930.

Figure 10:
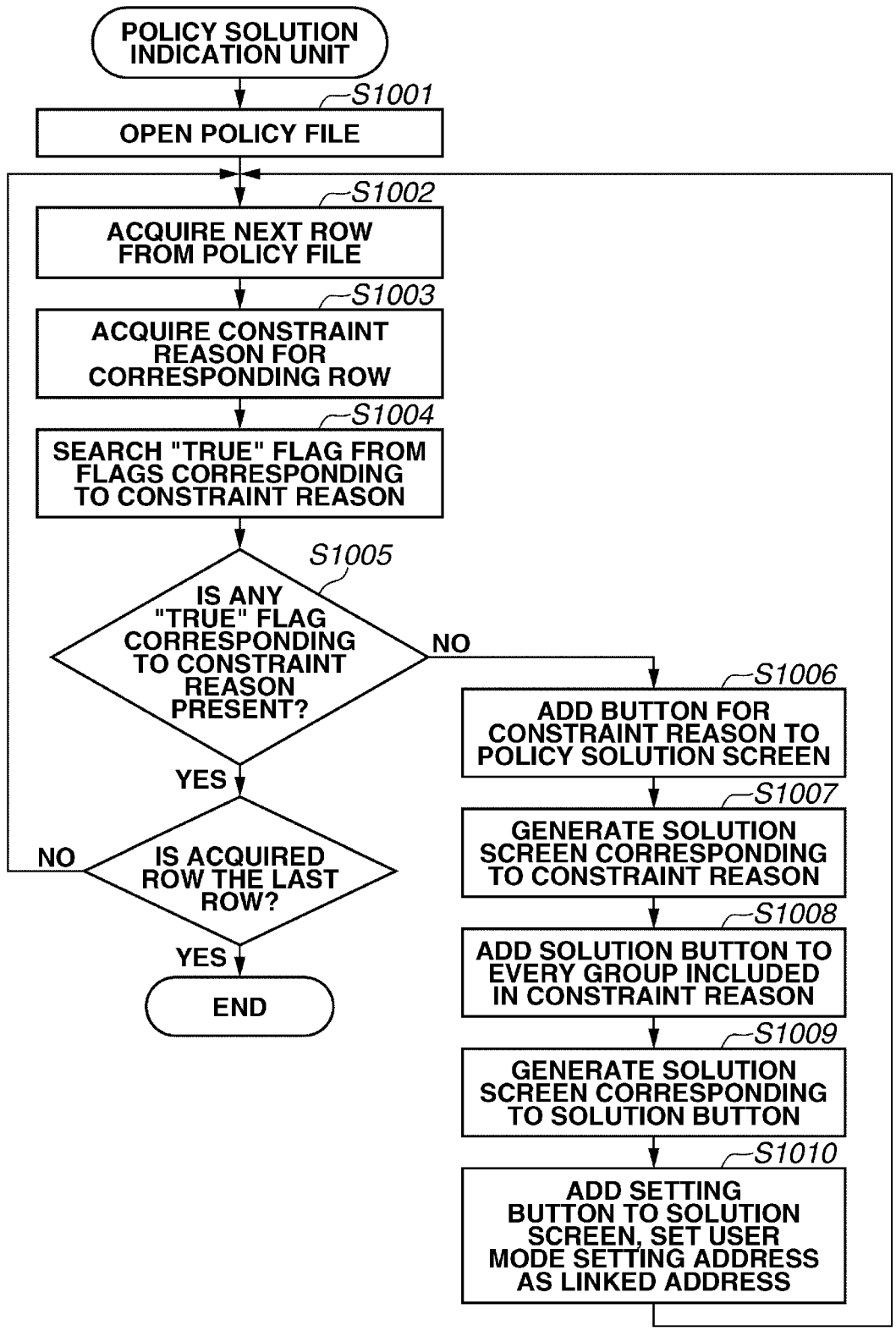
FIG. 10 is a flowchart illustrating an operation performed by the multifunction peripheral when the multifunction peripheral does not follow the security policy.

FIG. 10 is a flowchart illustrating the operation of the multifunction peripheral 101. The processing of the flowchart in FIG. 10 corresponds to the processing performed in step S715 in FIG. 7.

In step S1001, the CPU 108 opens a policy file 600 stored in the storage device 110. In step S1002, the CPU 108 acquires one row from the policy file 600. In step S1003, the CPU acquires a constraint reason of the acquired row.

In step S1004, the CPU 108 searches the policy file 600 for the constraint reason with the "TRUE" flag. In step S1005, the CPU 108 determines whether any "TRUE" flag is present for the constraint reason. If the CPU 108 determines that all of the flags are "FALSE" (NO in step S1005), the CPU 108 determines that the policy group which fulfills the security policy of the constraint reason is not present. Therefore, the CPU 108 generates a solution screen. Thereafter, the processing proceeds to step S1006. In step S1006, the CPU 108 adds the icons 902, 903 for the corresponding constraint reasons to the security policy solution screen 901. Further in step S1007, the CPU 108 generates the solution screen 910 corresponding to the constraint reason. The security policy solution screen 901 is shifted to the solution screen 910 by pressing the icon 902 that is added in step S1006.

Next, in step S1008, the CPU 108 adds the solution icons 911, 912 corresponding to the constraint reason onto the solution screen 910 that has been generated in step S1007. The CPU 108 adds the solution icons according to the number of policy groups corresponding to the constraint reason.

In step S1009, the CPU 108 generates the solution screens 920, 930 corresponding to the solution icons 911 and 912 respectively. The solution screen 910 is shifted either to the solution screen 920 or the solution screen 930 when the solution icon 911 or the solution icon 912 is pressed. The solution icons 911, 912 are added onto the solution screen 910 through the processing performed in step S1008. In step S1010, the CPU 108 respectively adds user mode setting icons 921, 931, 932 corresponding to the solutions 1 and 2 onto the solution screens 920 and 930 generated in step S1009. According to the information indicated in the user mode setting address 311 associated with the user mode setting value 301 in FIG. 3, each of the user mode setting icons 921, 931, 932 causes the solution screen 920 or 930 to shift to an actual setting screen. This setting screen is identical to the existing user mode setting screen.

In addition to a function that is operated through an instruction from the operation unit 103, the multifunction peripheral 101 also provides a service through the network. As a typical example, there is provided a printing service using a printer port such as a line printer port (LPR) or a port 9100. In addition, a web interface for a web browser using the Hypertext Transfer Protocol (HTTP) defined in RFC 2616 can be given as another example.

As with the case for the operation performed through the operation unit 103, the CPU 108 stops the service through the network if the CPU 108 determines that the security policy cannot be maintained.

Figure 11:
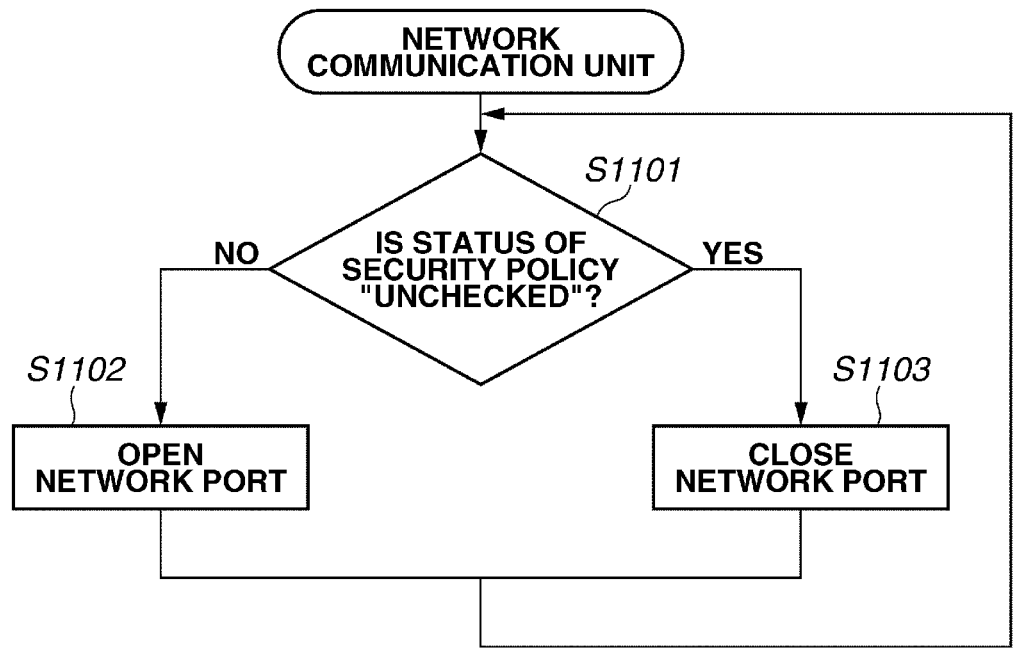
FIG. 11 is a flowchart illustrating an operation of a network communication unit.

FIG. 11 is a flowchart illustrating the operation of the network communication unit 102 disposed on the multifunction peripheral 101. In step S1101 of FIG. 11, the CPU 108 determines the checking status of the security policy that has been set through the processing in step S703, step S707, or step S711 in FIG. 7. In a case where the CPU 108 determines that the status of the security policy is "UNCHECKED" (YES in step S1101), the processing proceeds to step S1103. In step S1103, the CPU 108 closes a network port. In a case where the CPU 108 determines that the status of the security policy is "CHECKED" (NO in step S1101), the processing proceeds to step S1102. In step S1102, the CPU 108 opens the network port. The network port represents a specific interface for providing the above-described service, and the CPU 108 can restrict the service by closing the network port. In practice, a protocol stack in the conventional technique has to be implemented for the network.

Further, the network communication unit 102 is applicable to a local interface such as the Universal Serial Bus (USB) in addition to the network connection.

As described above, according to the present exemplary embodiment, the solution can be promptly indicated by the policy solution screens 901, 910, 920, and 930 in a case where the security policy is not fulfilled. Therefore, the user (practically, the administrator) can immediately find out which user mode setting value has to be changed to fulfill the security policy. This enables the administrator to save time and effort required to change the user mode setting value. According to the present exemplary embodiment, in a case where the multifunction peripheral 101 does not satisfy the security policy, the solution can be promptly indicated by the policy solution screens in step S715. However, as a modification example, following processing may also be carried out. When it is determined that verification of the security policy has failed (NO in step S710), the CPU 108 identifies a user mode setting value which has caused the failure of the security policy verification and may automatically change the identified user mode setting value. More specifically, the CPU 108 identifies the user mode setting value by a method described in the processing of step S108 of FIG. 8 that changes the identified user mode setting value from OFF to ON. By the procedures as described above, it is possible to automatically change the user mode setting value which has caused the failure of the security policy verification.

In the present exemplary embodiment, the CPU 108 executes each of the steps in the flowcharts illustrated in FIGS. 7, 9, and 11 by reading out the program code from the storage device 110. However, a part of the steps thereof may be realized by employing other hardware resource. For example, the verification processing for the security policy performed in step S709, or the display processing for the policy solution screens performed in step S715 may be executed by a processing unit other than the CPU 108. For example, a policy verification unit may be disposed as a device for executing the processing of step S709, and the policy verification unit may verify the security policy according to an instruction from the operation unit 103.

Further, in the present exemplary embodiment, the user mode setting value 301 in FIG. 3, the policy table in FIG. 5, and the policy file 600 in FIG. 6 are stored in the storage device 110. However, each piece of the information may be separately stored in a different storage device.

In the first exemplary embodiment, the security policy is set by the multifunction peripheral 101. However, in practice, a plurality of multifunction peripherals may be introduced to the office or the business entity. Therefore, performing the security policy setting with respect to each of the multifunction peripherals requires great time and effort, and thus a task of the administrator becomes complicated. Therefore, in a second exemplary embodiment, setting of the security policy is performed in a server.

Figure 12:
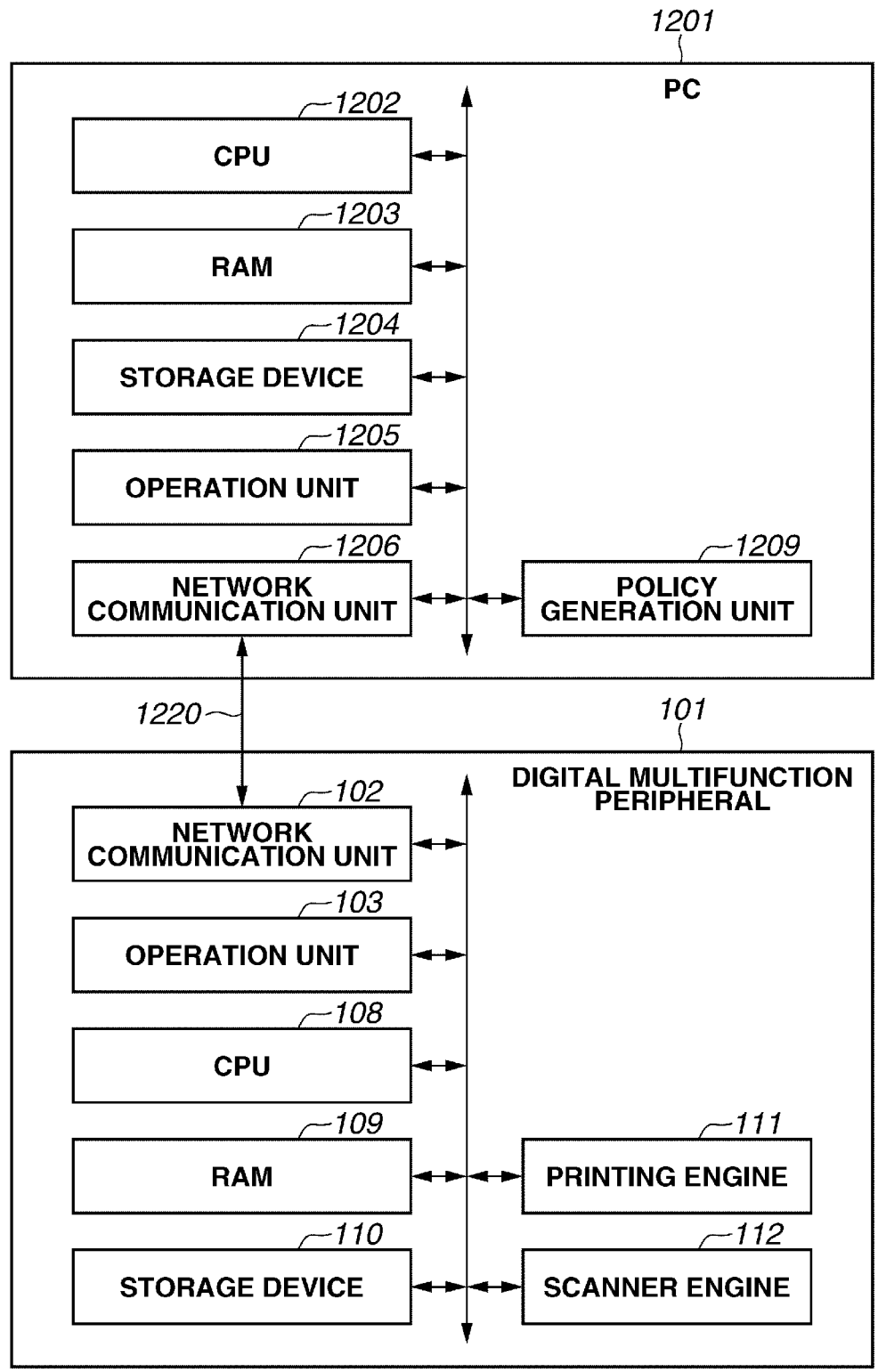
FIG. 12 is a block diagram illustrating a system configuration of a system configured of a multifunction peripheral and a personal computer (PC).

FIG. 12 is a block diagram illustrating a configuration of a system configured of a multifunction peripheral and a PC. As illustrated in FIG. 12, the system is configured of a PC 1201, a multifunction peripheral 1211, and a communication unit 1220. The communication unit 1220 connects the PC 1201 and the multifunction peripheral 1211.

Further, the PC 1201 includes a CPU 1202 and a RAM 1203. The CPU 1202 operates the PC 1201. A program code and data executed by the CPU 1202 are tentatively stored in the RAM 1203.

The program code and the data executed by the CPU 1202 are permanently stored in a storage device 1204. The storage device 1204 is configured of a hard disk drive (HDD). An operation unit 1205 is configured of predetermined input and output devices such as a liquid crystal display, a keyboard, and a mouse. A network communication unit 1206 performs communication through the communication unit 1220. A policy generation unit 1209 performs setting of the security policy.

The present exemplary embodiment differs from the first exemplary embodiment in that the PC 1201 transmits the policy table of FIG. 5 via the network communication unit 1206, the communication unit 1220, and the network communication unit 1216. A communication protocol such as a file transfer protocol (FTP), or a server message block (SMB) is employed to transfer the policy table, and a communication pathway is encrypted by the SSL.

In the present exemplary embodiment, except for a point where the multifunction peripheral 1211 does not perform setting of the security policy through the operation unit 103, the operations of the multifunction peripheral 1211 are the same as those in the multifunction peripheral 101 described in the first exemplary embodiment. Accordingly, in a same manner as in the first exemplary embodiment, the multifunction peripheral 1211 generates a policy file 600 based on the policy table and the user mode setting value 301, verifies whether the multifunction peripheral 1211 follows the security policy, and indicates a solution if the multifunction peripheral 1211 does not follow the security policy.

In the present exemplary embodiment, the setting of the security policy is intensively performed by the PC 1201. Thus, the security policy can be easily introduced into a plurality of multifunction peripherals.

In addition, the present invention can be realized by executing the following processing. In other words, software (i.e., program) which realizes the functions of the above-described exemplary embodiments is supplied to a system or an apparatus via a network or various storage media. Then, a computer (or a CPU or a micro processing unit (MPU)) of the system or the apparatus reads out and executes the program.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-015598 filed Jan. 27, 2012, which is hereby incorporated by reference herein in its entirety.

The invention claimed is:

1. A multifunction peripheral device comprising:
an obtaining unit configured to obtain a security policy;
a determination unit configured to determine whether or not each function of the multifunction peripheral device complies with the security policy obtained by the obtaining unit;
a hardware processor configured to restrict use of a specific function determined by the determination unit not to comply with the security policy;
a display control unit configured to display the security policy solution screen including a link to a change screen for changing a setting of a specific function so as to comply with the security policy obtained by the obtaining unit, wherein the display control unit is further configured to perform screen transition to the change screen in response to a user's selection of the link included in the security policy solution screen,
wherein the use of the specific function remains restricted until at least the setting of the specific function is changed via the change screen.

2. The multifunction peripheral device according to claim 1, wherein the security policy includes a policy relating to encrypt communication.

3. The multifunction peripheral device according to claim 1, further comprising at least a transmission function for transmitting data to an external apparatus via a network, wherein the transmission function is disabled in a case where the transmission function is the found function that does not correspond to the security policy.

4. The multifunction peripheral device according to claim 1, further comprising at least a copying function, wherein the copying function is disabled in a case where the copying function is the found function that does not correspond to the security policy.

5. A control method for a multifunction peripheral device comprising:
obtaining, by an obtaining unit, a security policy for the multifunction peripheral device;
determining, by a determination unit, whether or not each function of the multifunction peripheral device complies with the security policy obtained by the obtaining unit;
restricting use of a specific function determined by the determination unit not to comply with the security policy;
displaying, by a display control unit, the security policy solution screen including a link to a change screen for changing a setting of a specific function so as to comply with the security policy obtained by the obtaining unit, wherein the display control unit is further configured to perform screen transition to the change screen in response to a user's selection of the link included in the security policy solution screen,
wherein the use of the specific function remains restricted until at least the setting of the specific function is changed via the change screen.

6. A non-transitory computer readable storage medium storing a computer program for a computer to execute a control method for a multifunction peripheral device, the control method comprising:
obtaining, by an obtaining unit, a security policy for the multifunction peripheral device;
determining, by a determination unit, whether or not each function of the multifunction peripheral device complies with the security policy obtained by the obtaining unit;
restricting use of a specific function determined by the determination unit not to comply with the security policy;
displaying, by a display control unit, the security policy solution screen including a link to a change screen for changing a setting of a specific function so as to comply with the security policy obtained by the obtaining unit, wherein the display control unit is further configured to perform screen transition to the change screen in response to a user's selection of the link included in the security policy solution screen,
wherein the use of the specific function remains restricted until at least the setting of the specific function is changed via the change screen.

7. The multifunction peripheral device according to claim 1, further comprising a PDF transmitting function, wherein the PDF transmitting function is disabled in a case where the PDF transmitting function is the found function that does not correspond to the security policy.

8. The multifunction peripheral device according to claim 1, wherein the display control unit is configured to display a security policy solution screen including links to a plurality of change screens for changing a setting of the function that does not correspond to the security policy.

9. The multifunction peripheral device according to claim 1, wherein the security policy is a security policy relating to authentication.

* * * * *